United States Patent [19]

Miyasaka

[11] Patent Number: 5,006,944
[45] Date of Patent: Apr. 9, 1991

[54] CASSETTE LOADING DEVICE WITH A FLAT-CUT CAM FOLLOWER

[75] Inventor: Kenji Miyasaka, Kanagawa, Japan

[73] Assignee: Sony Corporation, Tokyo, Japan

[21] Appl. No.: 410,498

[22] Filed: Sep. 21, 1989

[30] Foreign Application Priority Data

Oct. 12, 1988 [JP] Japan .............................. 63-133125[U]

[51] Int. Cl.⁵ .............................................. G11B 17/04
[52] U.S. Cl. .................................. 360/99.06; 360/99.02
[58] Field of Search ............... 360/99.06, 96.05, 99.02, 360/99.03, 99.07

[56] References Cited

U.S. PATENT DOCUMENTS 4,467,378 8/1984 Schatteman ........................ 360/96.5
4,703,373 10/1989 Oosaka .............................. 360/99.02

Primary Examiner—David J. Severin
Attorney, Agent, or Firm—Ronald P. Kananen

[57] ABSTRACT

In a cassette loading device of the invention in which columnar cam followers formed on both the sides of a cassette holder are guided by inclined cam grooves formed in both the sides of a slide member upon reciprocal movement of the slide member so as to reciprocate the cassette holder between a cassette inserting position and a cassette loading position, a D-cut surface is formed on a portion of each cam follower which is located away from the center of the columnar cam follower toward the cassette loading position side with respect to the cassette inserting position, thereby reducing the ejection stroke and ejection operating force of the slide member which are required to eject the cassette holder from the cassette loading position to the cassette inserting position.

3 Claims, 3 Drawing Sheets

CASSETTE LOADING DEVICE WITH A FLAT-CUT CAM FOLLOWER

BACKGROUND OF THE INVENTION

1. Field of the Invention

The present invention relates to a cassette loading device, for example, the device applicable for a floppy disk recording and/or reproducing unit.

2. Description of the Prior Art

A conventional cassette loading device for a floppy disk has an arrangement shown in FIGS. 2 to 4, which is also disclosed in U.S. Pat. No. 4,750,065.

In a cassette loading device of this type, a floppy disk 1 accommodated in a disk cassette 2 is mounted on and demounted from a disk table 4 in a chassis 3, and brought into contact with and separated from a pair of upper and lower recording and/or reproducing heads 5 in the chassis 3. Further, a cassette holder 6 and a slide member 7 for ascending and descending the disk cassette 2 between a cassette inserting position and a cassette loading position are arranged in the chassis 3. The slide member 7 is designed to be freely moved between a forward position $P_1$ shown in FIG. 3B and a backward position $P_2$ shown in FIG. 3A in a direction of arrows a and b, which is parallel to a cassette inserting and ejecting direction. The cassette holder 6 is designed to be freely moved between a cassette inserting position (an upper position) $P_3$ shown in FIG. 3A and a cassette loading position (a lower position) $P_4$ shown in FIG. 3B in a direction of arrows c and d, which is perpendicular to the cassette inserting and ejecting direction. Two pairs of columnar cam followers 8 are formed on the front and rear portions of respective sides of the cassette holder 6. The slide member 7 has a substantially U-shaped section, and two pairs of inclined grooves (hereinafter described as cam means) 9 are formed in the front and rear portions of respective sides of the slide member 7. The cam followers 8 are loosely fitted in the cam means 9, respectively. It is to be noted that horizontally extending edges 10 for holding the cam followers 8 are disposed near the forward upper position (situated at the side of the distal end of the arrow b) of the inclined cam means 9 that are provided on the respective sides of the slide member 7. In addition, a pair of vertical grooves 11 are formed in the respective sides of the chassis 3 so as to be parallel to the direction of arrows c and d. The pair of cam followers 8 are loosely fitted also in the respective vertical grooves 11. The slide member 7 is urged by a pair of springs 12 shown in FIG. 2 in the direction of arrow b. Further, an ejection button 13 shown in FIGS. 3A and 3B is arranged at the front end of the slide member 7.

The operation of the cassette loading device will be as follows.

Before the cassette 2 is loaded, the cassette holder 6 is set in the cassette inserting position $P_3$, where the cam followers 8 of the cassette holder 6 are located on the edges 10 of the slide member 7 as shown in FIG. 3A.

When a cassette 2 is loaded, that is, when a disk cassette 2 is inserted into the cassette holder 6 in the direction of arrow a, and set in the cassette inserting position $P_3$ as shown in FIG. 3A, a trigger mechanism (not shown) is put in action, and the slide member 7 is automatically moved, by the pair of springs 12, from the backward position $P_2$ shown in FIG. 3A to the forward position $P_1$ shown in FIG. 3B by a distance corresponding to a stroke $S_1$ shown in FIG. 4 in the direction indicated by the arrow b. With this operation, the cam followers 8 drop into the respective inclined cam means 9 from the horizontal edges 10. In this case, upper inclined cam face 9a of the inclined cam means 9 shown in FIG. 4 are coupled with the cam followers 8 so as to move the cam followers 8 downward in the direction of arrow c. As the result, the cassette holder 6 is guided by the pair of vertical grooves 11 and moved only downward from the cassette inserting position $P_3$ shown in FIG. 3A to the cassette loading position $P_4$ shown in FIG. 3B in a direction parallel to the direction of arrow c. The floppy disk 1 in the disk cassette 2 is then loaded on (chucked by) the disk table 4, and simultaneously, the pair of upper and lower recording/reproducing heads 5 are brought into contact with the upper and lower surfaces of the floppy disk 1.

At the time, as shown in FIG. 4, each cam follower 8 is urged downward from the cassette inserting position $P_2$ to the cassette loading position $P_1$ by the vertical component $F_2$ of a force F. The force F is generated when the force of the pair of springs 12 is transmitted from the upper inclined cam face 9a of the inclined cam means 9 to the cam follower 8 through a contact point A shown in FIG. 4. It is to be noted that the horizontal component $F_1$ of the force F is cancelled with the reaction generated between the vertical groove 11 and the cam follower 8, and the component $F_2$ acts on the floppy disk 1 through the disk cassette 2 so as to press the floppy disk 1 against the disk table 4.

After the cassette 2 is loaded, the floppy disk 1 is rotated by the disk table 4, and at the same time, the pair of upper and lower recording and/or reproducing heads 5 are moved in the direction of arrows a or b by a head moving unit 14, and thereby, recording/reproducing operation of the floppy disk 1 is performed.

When the cassette 2 is to be ejected, the ejection button 13 is depressed in the direction of arrow a in FIG. 3B to move the slide member 7 against the pair of springs 12 from the forward position $P_1$ shown in FIG. 3B to the backward position $P_2$ shown in FIG. 3A in the direction of arrow a by the distance corresponding to the stroke $S_1$ shown in FIG. 4. As the result, the lower inclined cam faces 9b (shown in FIG. 4) of the inclined cam means 9 are coupled with the cam followers 8 so as to move the cam followers 8 upward in the direction of arrow d, and simultaneously, the cassette followers 8 are guided by the pair of vertical grooves 11. Thus, the cassette holder 6 is moved upward from the cassette loading position $P_4$ shown in FIG. 3B to the cassette inserting position $P_3$ shown in FIG. 3A in the direction parallel to the direction of arrow d. With this operation, the floppy disk 1 in the disk cassette 2 is separated from the disk table 4, and at the same time, the pair of upper and lower recording/reproducing head 5 are vertically separated from the floppy disk 1. As the cam followers 8 are respectively located on the horizontal edges 10, the slide member 7 is locked by the trigger mechanism again in the backward position $P_2$. At the same time, a cassette unloading mechanism (not shown) is put in action to automatically unload the disk cassette 2 from the cassette holder 6 raised to the cassette inserting position $P_3$ shown in FIG. 3A, in the direction of arrow b.

It is to be noted that FIG. 4 shows, on an enlarged scale, a relationship between stroke $S_1$ of the slide member 7 and height H of the vertical movement of the cassette holder 6. Accordingly, the stroke $S_1$ is parallel to the direction of arrows a and b, and corresponds to the vertical movement of the cam followers 8 when the cassette holder 6 is moved in the direction of arrows c or d between the cassette inserting position $P_3$ and the cassette loading position $P_4$. That is, when the inclination angle $\theta_1$ of the inclined cam means 9 is set to be a predetermined angle (e.g., 45°) with respect to the horizontal reference and the height H is previously determined, the stroke $S_1$ is a value required of the slide member 7. However, in the conventional cassette loading device using the columnar cam followers 8, if the stroke $S_1$ of the slide member 7 (for ejecting the cassette 2) is changed, without changing the height H, to a stroke $S_2$ which is smaller than the stroke $S_1$, the inclination angle $\theta_1$, for example, of 45° of the cam means 9, which is indicated in solid lines in FIG. 4, must be changed to an angle, for example, of (45°+α), which is indicated in chain-and-dotted lines. Thus, an operating force for depressing the ejection button 13 to eject the cassette 2 becomes larger as the angle $\theta_1$ is changed to the angle $\theta_2$, and also, the vertical component $F_2$ necessary for pressing the floppy disk 1 against the disk table 4 in the cassette loading position $P_4$ is reduced.

SUMMARY OF THE INVENTION

It is an object of the present invention to provide a cassette loading device in which the ejection stroke of a slide member can be reduced without increasing the inclination angle of inclined cam means of the slide member.

In order to achieve the above object, according to the present invention, there is provided a cassette loading device wherein a D-cut surface 15 is formed on a portion of each cam follower 8 which is located away from a center 0 of the columnar cam follower 8 toward a cassette loading position $P_4$ side with respect to a cassette inserting position $P_3$, as shown in FIG. 1.

According to the cassette loading device having the above-described arrangement as shown in FIG. 1, since the D-cut surface 15 is formed on the cam follower 8, if the ejection stroke of a slide member 7 in the direction indicated by an arrow a which is required to raise a cassette holder 6 from a cassette loading position $P_4$ to a cassette inserting position $P_3$ by a height H is reduced from the stroke $S_1$ in the conventional device to a stroke $S_3$, the contact point of the cam follower 8 raised to the cassette inserting position $P_3$ with a lower inclined cam face 9b of a corresponding inclined cam means 9 is shifted from a contact point B of each of the conventional columnar cam followers 8 which is indicated by alternate long and short dashed lines to a contact point C of the D cut surface 15 as indicated in solid lines. Therefore, the inclination angle of each inclined cam means 9 can be reduced from a large inclination angle $\theta_2$ indicated in alternate long and short dashed lines to an inclination angle $\theta_3$ indicated in solid lines.

DETAILED DESCRIPTION OF THE PREFERRED EMBODIMENT

Figure 1:
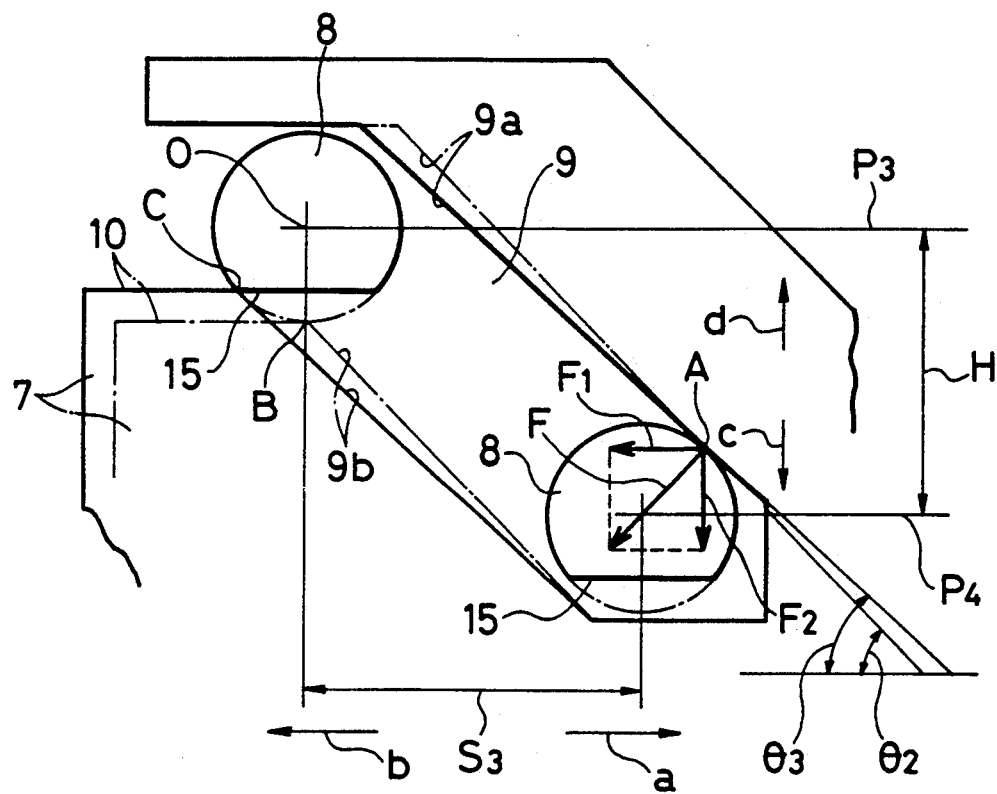
FIG. 1 is an enlarged side view showing a main part of an embodiment of the present invention.
Figure 4:
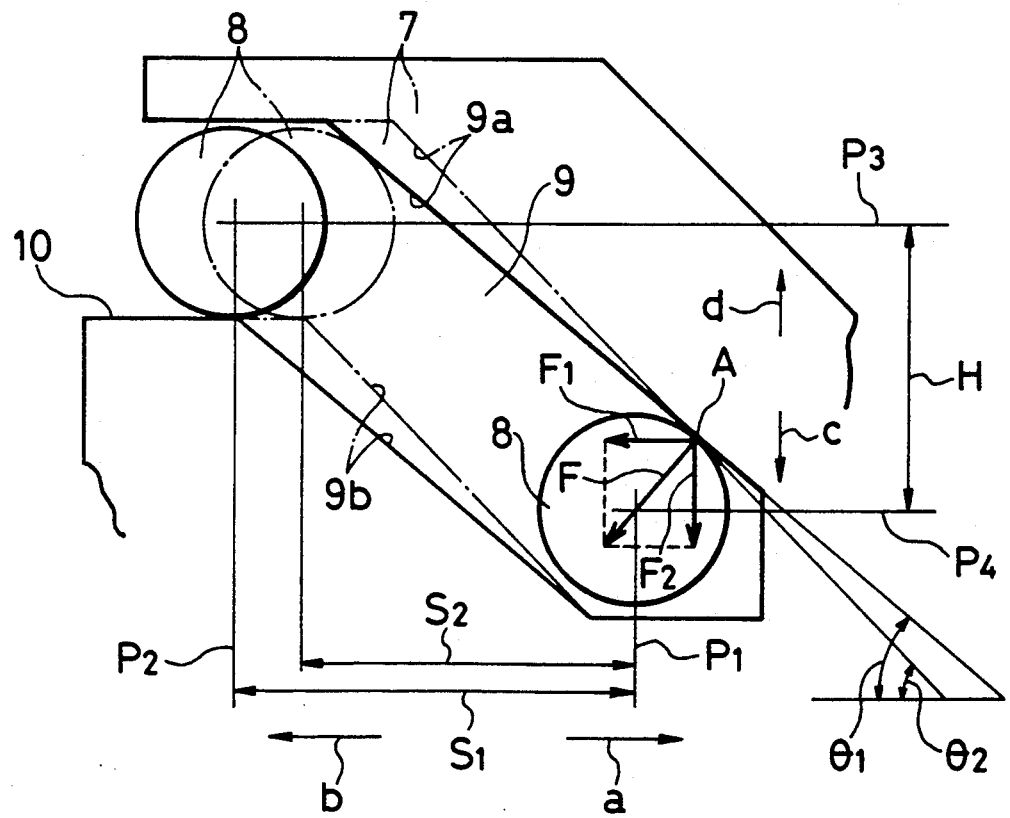
FIG. 4 is an enlarged side view showing a main part of a conventional cassette loading device.
Figure 2:
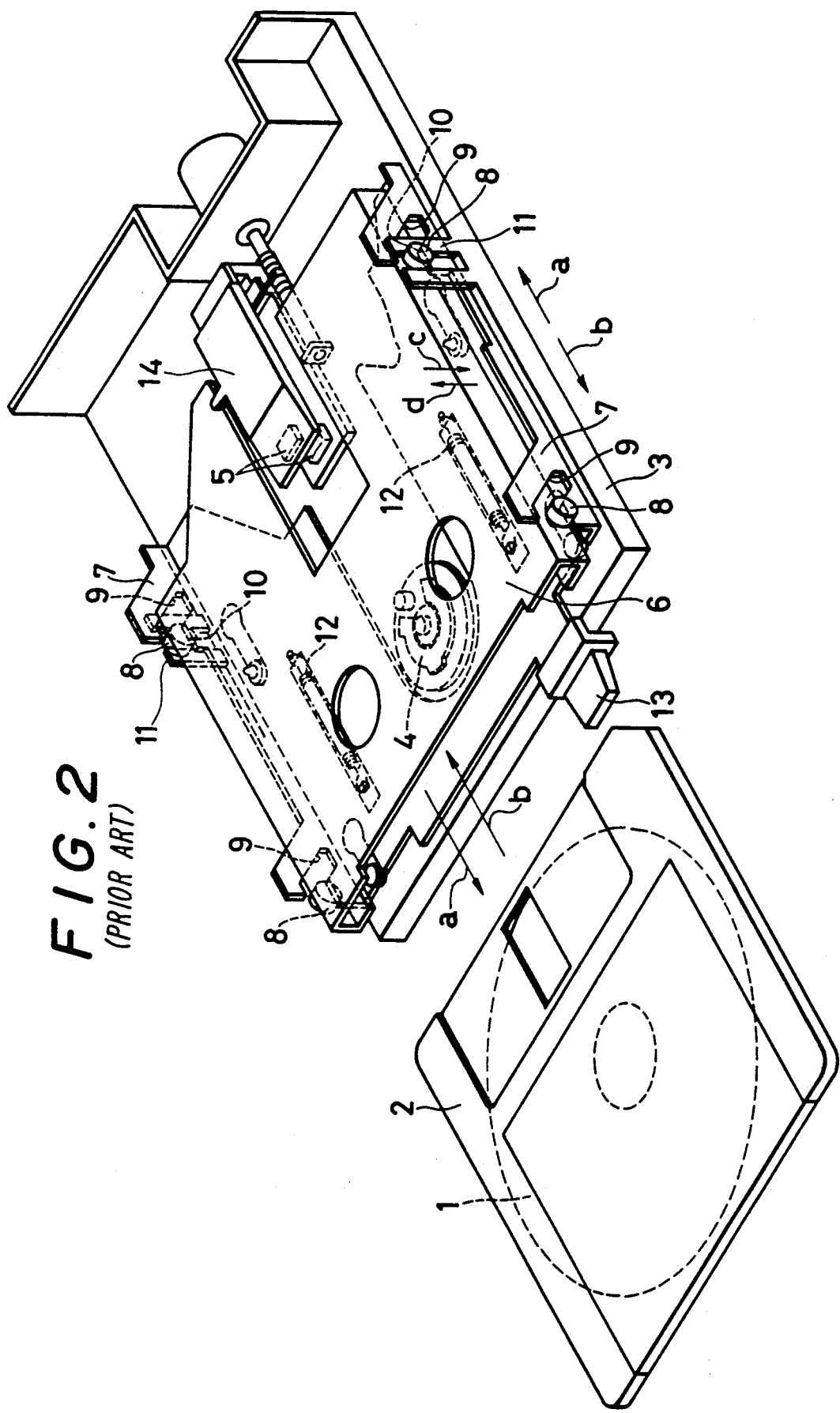
FIG. 2 is a perspective view showing an overall cassette loading device.
Figure 3A:
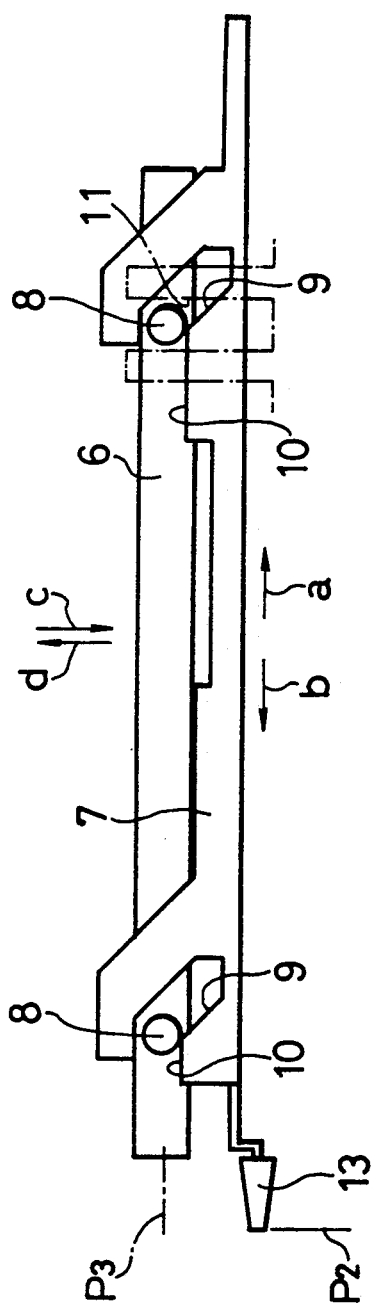
FIGS. 3A and 3B are side views showing a loading-/unloading operation of a cassette.
Figure 3B:
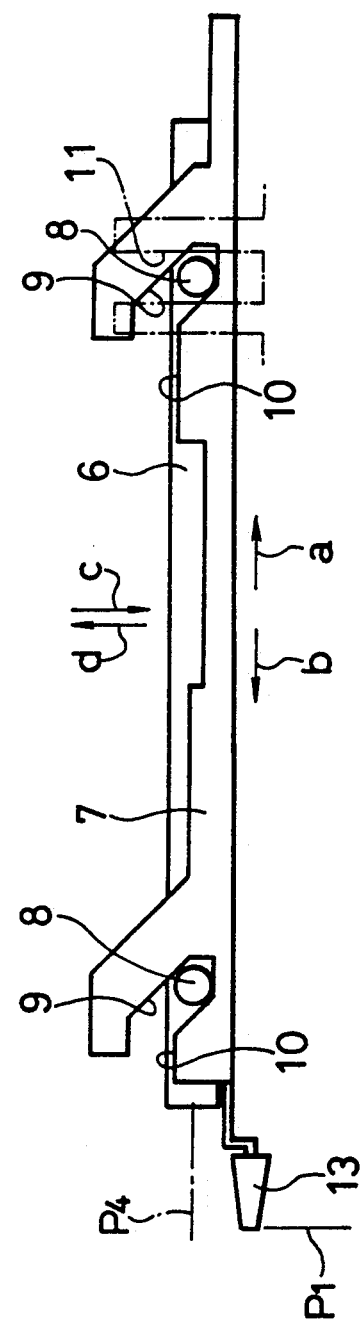

An embodiment of the present invention which is applied to a cassette loading device will be described below with reference to FIG. 1.

In this embodiment, a cassette loading device for a floppy disk unit similar to the conventional device is exemplified. As shown in FIG. 1, a D-cut surface 15 is formed on a portion of each cam follower 8 which is located away from a center O of the columnar cam follower 8 toward a cassette loading position $P_4$ side with respect to a cassette inserting position $P_3$ (i.e., at a side located away from the center O in the direction indicated by an arrow d). It is to be noted that other arrangements of this cassette loading device are the same as those of the conventional device.

According to the cassette loading device of this embodiment, even if the ejection stroke of a slide member 7 in the direction indicated by an arrow a is reduced to a stroke $S_3$, the inclination angle of the inclined groove 9 of the slide member 7 can be reduced to an inclination angle $\theta_3$, as described above.

If the inclination angle of the inclined cam means 9 can be set to be as small as the inclination angle $\theta_3$, an ejection operation force, which is required to move the slide member 7 in the direction of arrow a so as to eject a cassette holder 6 from the cassette loading position $P_4$ to the cassette inserting position $P_3$, can be reduced. In addition, a cassette holding force (a component $F_2$) at the cassette loading position can be satisfactorily kept at a predetermined value.

An embodiment of the present invention has been described above. However, the present invention is not limited to the above embodiment. Various changes and modifications can be made within the spirit and scope of the invention.

In the above embodiment, a loading device for a disk cassette is exemplified. However, the present invention can be applied to loading devices for various cassettes such as a tape cassette.

Since the present invention has the above-described embodiment, the following effects can be obtained.

Since the ejection stroke of the slide member can be reduced without increasing the inclination angle of the inclined cam means of the slide member, a cassette can be easily ejected from the cassette loading position to the cassette inserting position with a small ejection operation force, and further, a sufficiently large cassette holding force at the cassette loading position is ensured.

What is claimed is:

1. In a cassette loading device comprising:
    a cassette holder capable of ascending and descending between a cassette inserting position and a cassette loading position in a direction perpendicular to a cassette inserting direction together with a cassette inserted therein;
    a slide member having two sides which is slidable in said cassette inserting direction;
    cam means provided in said sides of said slide member and inclined with respect to said cassette inserting direction, and
    columnar cam followers arranged on the respective sides of said cassette holder so as to be coupled with said cam means of said slide member, whereby said cassette holder is raised or lowered while said slide member is moved in said cassette inserting direction;

the improvement in which a D-cut flat portion is formed on a lower portion of each of said columnar cam followers so that the amount of inclination of said cam means can be reduced without changing predetermined displacements of both said slide member and said cassette holder.

2. A device according to claim 1, wherein said cam means comprises a lower inclined cam face coupled with the lower portion of each of said columnar cam followers, and an upper inclined cam face coupled with an upper portion of each of said columnar cam followers.

3. A device according to claim 1, wherein a couple of said columnar cam followers are provided on the respective sides of said cassette holder, and said cam means are arranged in four positions of said slide member in correspondence with said columnar cam followers.

* * * * *